3,177,269
GRAFT COPOLYMERS OF POLYOLEFINS AND ACRYLIC AND METHACRYLIC ACID AND METHOD OF MAKING THE SAME
Robert M. Nowak and Giffin D. Jones, Midland, Mich., assignors to The Dow Chemical Company, Midland, Mich., a corporation of Delaware
No Drawing. Filed Oct. 10, 1960, Ser. No. 61,357
8 Claims. (Cl. 260—878)

This invention concerns a method of making graft copolymers comprising polyolefins and acrylic acid and/or methacrylic acid, and pertains to compositions comprising the graft copolymer and homopolymers and copolymers of said acids. It relates more particularly to an improved method for making such graft copolymers and pertains to the graft copolymer products.

It is known to prepare polymeric products by subjecting a mixture of a polymerizable monomeric olefinic compound and a linear polymer in the absence of oxygen to an agitation treatment sufficient to degrade the linear polymer and thereby yield a polymer in the molecular structure of which the olefinic compound forms a part.

It is known to prepare polymeric products comprising graft copolymers by for example, polymerizing a monomer in the presence of, or in admixture with, a latex of an already formed polymer in an aqueous emulsion and in the presence or absence of an added polymerization catalyst.

It has now been discovered that graft copolymers of normally solid thermoplastic resinous homopolymers and copolymers of one or more aliphatic olefins containing from 2 to 4 carbon atoms in the molecule and copolymers containing a predominant amount of one or more of such aliphatic olefins chemically combined or interpolymerized in the copolymer molecules can readily be prepared in good yield and in pure or substantially pure graft copolymer form by a procedure which consists essentially of malaxing the normally solid thermoplastic olefin polymer at elevated heat-plastifying temperatures between 110° and 250° C. while contacting the heat-softened or molten polymer with a minor proportion, i.e. 50 percent by weight or less of the total mixture, of acrylic acid, methacrylic acid or a mixture of such acids having dissolved therein from 0.04 to 5 percent by weight of a peroxygen compound having a half-life of at least 15 minutes as determined by its decomposition rate in benzene at 100° C.

It is important that the malaxing, i.e. the kneading, rubbing, mixing or stirring, of the heat-plastified or molten polymer in contact with the monomer containing the peroxygen compound, be carried out in such manner as to avoid appreciable breakdown or degrading of the polymer molecules such as by carrying out the malaxing in a plastics screw type extruder or a Banbury mixer.

It has further been found that by malaxing the heat-softened or molten polymer with the monomeric acid containing the peroxygen compound dissolved therein, that there appears to be formed a large number of grafting sites along the polymer chains with the resultant formation of graft copolymers consisting predominantly of the substrate polymer having attached thereto a large number of grafted-on chains of the monomeric acid units of relatively short chain length. Such polymers are unique, and differ in their chemical composition and properties from graft copolymers consisting of substrate polymers having relatively few grafted-on chains of monomer units of long chain length, but of otherwise similar chemical composition.

The polymeric substrate to be employed in preparing the graft copolymers is preferably a homopolymer or copolymer of one or more aliphatic olefins containing from two to four carbon atoms in the molecule such as polyethylene, polypropylene, polyisobutylene, polybutene, copolymers of ethylene and propylene, copolymers of ethylene and isobutylene, or copolymers of ethylene and butene, although copolymers containing a predominant amount, i.e. 50 percent by weight or more, of one or more of the aliphatic olefins chemically combined or interpolymerized with a minor proportion of another monoethylenically unsaturated organic compound can be used, such as copolymers of a predominant amount by weight of ethylene and a minor proportion of styrene, vinyl acetate, or methyl methacrylate.

The monomers to be graft polymerized onto the polymeric substrate can be acrylic acid, methacrylic acid or mixtures of said acids in any and all proportions. The monomeric acid is employed in amounts corresponding to from 1 to 100, preferably from about 5 to about 50 parts by weight per 100 parts by weight of the polymer starting material, and preferably containing a polymerization inhibitor such as tert.-butyl catechol, hydroquinone or monomethyl ether of hydroquinone in amounts of about 0.02 percent by weight, but an inhibitor is not required.

The organic peroxygen compound to be employed as the agent for initiating the graft copolymerization reaction between the monomeric acid and the polymer starting material at the elevated heat-plastifying temperatures at which the reacting is carried out can be any organic peroxygen compound which is a polymerization catalyst for the monomeric acid and has a half-life of at least 15 minutes as determined by its decomposition rate in benzene at 100° C. Among suitable organic peroxygen compounds are tert.-butyl peracetate, tert.-butyl perbenzoate, di-tert.-butyl diperphthalate, tert.-butyl hydroperoxide, di-tert.-butyl peroxide, cumene hydroperoxide, dicumyl peroxide, benzoyl peroxide, and the like. Mixtures of any two or more of the organic peroxygen compounds can be used. The organic peroxygen compound can be used in amounts corresponding to from 0.04 to 5 percent by weight of the monomeric acid.

A method of determining the heat stability of organic peroxides has been described by D. F. Doehnert and O. L. Mageli, The Society of Plastics Industry Inc. (preliminary copy of a report to be presented at the 13th annual meeting of the Reinforced Plastics Division, Chicago, Illinois).

In practice, the polymer, e.g. polyethylene or polypropylene in the form of molding powder or granules, is fed to a plastics extruder wherein it is pressed and heated to a flowable or molten condition at temperatures between 110° and 250° C., and above the crystalline melting point of the polymer, under pressure. The monomeric acrylic acid or methacrylic acid, or a mixture thereof containing the organic peroxygen compound dissolved therein is fed under pressure into a mid-section of the barrel of the extruder and into contact with the heat-plastified or molten polymer. The resulting mixture is maintained molten or flowable and is blended into a homogeneous composition as it is forwarded by action of the screw in the barrel of the plastics extruder toward the discharge orifice or die. During contact and blending of the monomeric acid containing the peroxygen compound with the heat-plastified polymer at the elevated temperatures, the peroxygen compound undergoes decomposition with resultant initiating of a polymerization reaction and the formation of a graft copolymer. The monomeric acid and the molten or heat-plastified polymer are maintained in contact with one another at the elevated temperatures for a time sufficient to polymerize all or substantially all of the monomers, then is extruded and cooled and cut or ground to a granular form. In an alternate procedure the heat-plastified polymer and the monomeric acid are maintained in contact with one another at the elevated reaction temperatures until at least a predominant amount of the monomeric acid is polymerized, then is extruded, cooled and the graft copolymer separated from the reacted mixture.

The graft copolymer is recovered in pure or substantially pure form by dissolving the graft copolymer in a solvent in which the homopolymer is insoluble such as toluene, xylene, ethylbenzene, isopropylbenzene and the like, filtering the solution to separate the insoluble material and recovering the graft copolymer from the filtrate in usual ways, e.g. by precipitating the graft copolymer with methanol and separating, washing and drying the graft copolymer.

The new graft copolymers are useful for a variety of purposes. They can be molded by usual compression and injection molding operations or by extrusion methods to form useful articles such as boxes, cups, trays, or rods, bars, sheet or film material. The graft copolymers may contain from 1 to 50, preferably from about 5 to 35 percent by weight of the acrylic acid or methacrylic acid chemically combined with the polymeric substrate starting material. The graft copolymers possess good mechanical properties such as tensile strength, percent elongation and fluxural modulus, and in general possess improvement in one or more of such properties over the similiar properties for the polymeric substrate starting material.

The following examples illustrate ways in which the principle of the invention has been applied, but are not to be construed as limiting its scope.

EXAMPLE 1

Polyethylene having a melt index of 2 and in granular form was fed to a 1¼ inch diameter screw type plastics extruder at a rate of 24.5 grams per minute wherein it was pressed and heated to a molten condition under pressure at a temperature of about 190° C. The molten polyethylene under pressure was mixed with monomeric acrylic acid containing 0.04 percent by weight of tert.-butyl catechol as polymerization inhibitor for the monomer at ordinary temperatures and 0.75 percent by weight of tert.-butyl peracetate as catalyst for initiating interpolymerization of the monomeric acrylic acid with the heat-plastified polyethylene at the elevated temperatures, which monomeric acrylic acid was fed to a mid-section of the extruder barrel at a rate of 3 grams per minute. The resulting mixture was heated and mixed in the extruder barrel at temperatures of about 190° C. for a period of about 2.5 minutes, then was extruded through an orifice into the atmosphere wherein it was cooled and was cut to a granular form. Portions of the graft copolymer were injection molded to form test pieces of ⅛ x ½ inch cross-section. These test pieces were used to determine the tensile strength and percent elongation for the graft copolymer employing procedures similar to those described in ASTM D638-49T. Other portions of the product were used to determine the percent by weight of acrylic acid chemically combined or interpolymerized with the polyethylene starting material, and the percent of volatile material in the graft copolymer. The product was substantially pure graft copolymer having the properties set forth under A below. For comparison, the properties of the polyethylene starting material are set forth under B.

|  | A Graft Copolymer | B Polyethylene |
|---|---|---|
| Melt Index | 0.5 | 2 |
| Acrylic Acid | 9 |  |
| Tensile Strength | 1,670 | [1] 1,480 |
| Elongation | 180 | 157 |
| Volatile | 0.5 |  |

[1] Lbs./sq. in.

EXAMPLE 2

In each of a series of experiments, polyethylene having a melt index of 2 was fed to a 2½ inch screw diameter Welding Engineers plastics extruder at a rate of 50 pounds per hour wherein the polyethylene was pressed, heated at temperatures of from 185° to 200° C. and was mixed with acrylic acid containing 0.02 percent by weight of tert.-butyl catechol as inhibitor and 1 percent by weight of dicumyl peroxide as interpolymerization catalyst, also fed to the barrel of the extruder at a rate sufficient to form a composition or graft copolymer containing chemical combined or interpolymerized acrylic acid in amount as stated in the following table. The mixture of the acrylic acid and the heat-plastified polyethylene was blended under pressure in the plastics extruder at temperatures between 185° and 200° C. for a period of 5 minutes, then was extruded through an orifice into the atmosphere and was cooled and ground to a granular form suitable for molding. The graft copolymer product was recovered employing procedure similar to that employed in Example 1. Molded test pieces of the graft copolymer product were used to determine the tensile strength and percent elongation for the composition employing procedure similar to that described in ASTM D638-49T. Other portions of the composition were tested for melt index employing procedure similar to that described in ASTM D1238-57T, and for percent volatiles.

Table I identifies the compositions by giving the proportions of polyethylene and acrylic acid used in preparing the same. The table also gives the properties determined for the composition. For comparison the properties of the polyethylene are also given in the table as Run No. 1.

*Table I*

| Run No. | Starting Materials | | Product | | | |
|---|---|---|---|---|---|---|
|  | Polyethylene, percent | Acrylic Acid, percent | Melt Index | Tensile Strength, lbs./sq. in. | Elongation, percent | Volatiles, percent |
| 1 | 100 | 0 | 2 | 1,500 | 157 | 0.2 |
| 2 | 96 | 4 | 1.2 | 1,655 | 170 | 0.4 |
| 3 | 90 | 10 | 0.7 | 1,755 | 160 | 0.9 |
| 4 | 87 | 13 | 0.6 | 1,775 | 145 | 1.5 |

EXAMPLE 3

By procedure similar to that described in Example 2, granular polypropylene was fed to the plastics extruder and mixed with acrylic acid containing 2 percent by weight of dicumyl peroxide, in proportions as stated in the following table. The mixture of the acrylic acid and the polypropylene was blended in the extruder under pressure at temperatures between 175° and 200° C. for about 30 seconds, then was extruded, cooled and was ground to a granular form. Table II identifies the compositions and gives the properties determined for said compositions.

*Table II*

| Run No. | Starting Materials | | Product | | | |
|---|---|---|---|---|---|---|
|  | Polypropylene, percent | Acrylic Acid, percent | Melt Index | Tensile Strength, lbs./sq. in. | Elongation, percent | Volatiles, percent |
| 1 | 100 | 0 | 1.0 | ---- | (¹) | 0.2 |
| 2 | 92 | 8 | 2.4 | 4,265 | 17.5 | 9.0 |
| 3 | 88 | 12 | 2.1 | 4,440 | 15.5 | 0.75 |

[1] Cold draws.

EXAMPLE 4

In each of a series of experiments polyethylene having a melt index of 2 was fed to a plastics extruder wherein it was blended with acrylic acid in proportions as stated in the following table in the presence of an organic peroxide of a kind and amount as stated in the table, employing an apparatus and procedure similar to that employed in Example 1. Table III identifies the experiments, names the peroxide used and gives the properties determined for the compositions.

*Table III*

| Run No. | Starting Material | | | Product | | | | |
|---|---|---|---|---|---|---|---|---|
| | Polyethylene, percent | Acrylic Acid, percent | Melt Index | Organic Peroxide, Kind | Percent | Tensile Strength, lbs./sq. in. | Elongation, percent | Melt Index |
| 1 | 100 | 0 | 2 | None | | 1,480 | 157 | 2 |
| 2 | 94 | 6 | 2 | Tert.-butyl hydroperoxide | 1 | 1,660 | 169 | 1.2 |
| 3 | 93 | 7 | 2 | Di-tert.-butyl peroxide | 1 | 1,630 | 170 | 1.6 |
| 4 | 93 | 7 | 2 | Tert.-butyl perbenzoate | 1 | 1,690 | 161 | 1.6 |
| 5 | 93 | 7 | 2 | Methyl ethyl ketone peroxide | 1 | 1,680 | 165 | 1.1 |
| 6 | 93 | 7 | 2 | Cumene hydroperoxide | 1 | 1,628 | 163 | 1.6 |
| 7 | 93 | 7 | 2 | Benzoyl peroxide | 1 | 1,673 | 175 | 1.4 |
| 8 | 91 | 9 | 2 | Tert.-butyl peracetate | 1 | 1,610 | 170 | 0.9 |

EXAMPLE 5

In each of a series of experiments, polypropylene having a melt index of 0.9 was fed to a plastics extruder wherein it was blended with acrylic acid containing tert.-butyl catechol and tert.-butyl peracetate, and in proportions as stated in the following table employing an apparatus and procedure similar to that employed in Example 1. Table IV identifies the experiments and gives the properties determined for the composition.

*Table IV*

| Run No. | Starting Materials | | Product | | |
|---|---|---|---|---|---|
| | Polypropylene, Percent | Acrylic Acid, Percent | Tensile Strength, lbs./sq. in. | Elongation, percent | Melt Index |
| 1 | 100 | 0 | 2,575 | 100 | 0.9 |
| 2 | 92 | 8 | 2,875 | 32 | 0.9 |
| 3 | 88 | 12 | 3,066 | 37 | 1.1 |

EXAMPLE 6

Polyethylene having a melt index of 3.4 was fed to a plastics extruder wherein it was mixed with acrylic acid in proportions as stated in the following table in the presence of dicumyl peroxide in proportion based on the acrylic acid, as stated in said table employing an apparatus and procedure similar to that employed in Example 1. Table V identifies the experiments and gives the properties determined for the composition.

*Table V*

| Run No. | Starting Material | | | Product | | |
|---|---|---|---|---|---|---|
| | Polyethylene, Percent | Acrylic Acid, Percent | Dicumyl Peroxide, Percent | Yield Strength, lbs./sq. in. | Elongation, Percent | Melt Index |
| 1 | 100 | 0 | 0 | 3,046 | Cold Draws | 3.4 |
| 2 | 93 | 7 | 2.5 | 3,660 | do | 1.0 |
| 3 | 88 | 12 | 1.0 | 3,590 | do | 1.0 |
| 4 | 85 | 15 | 2.0 | 3,700 | 40 | 0.8 |

EXAMPLE 7

A copolymer of 95 mole percent propylene and 5 mole percent ethylene containing 0.1 percent by weight of 2,6-di-tert.-butyl-4-methyl phenol as antioxidant was fed to a 1¼ inch diameter screw type extruder at a rate of 15 grams per minute, wherein it was heated and was mixed with acrylic acid containing 0.02 percent by weight of hydroquinone monomethyl ether and 1 percent of dicumyl peroxide, also fed to the extruder at a rate of 1 gram per minute. The resulting mixture was blended under pressure in the barrel of the extruder at temperatures up to 200° C. for a time of about 3 minutes, then was extruded into the atmosphere. The extruded material was devolatilized by heating the same under subatmospheric pressure then was cooled and crushed to a granular form. The product was analyzed and was found to contain 4.5 percent by weight of chemically combined acrylic acid.

EXAMPLE 8

Polyethylene having a melt index of 2 was fed to a 1¼ inch diameter screw type extruder at a rate of 23 grams per minute wherein it was heated and blended under pressure with methacrylic acid containing 0.02 percent by weight of tert.-butyl catechol and 1 percent of dicumyl peroxide, which methacrylic acid was fed to the barrel of the extruder at a rate of about 3 grams per minute. The resulting mixture was blended under pressure in the barrel of the extruder at temperatures up to 180° C. for a period of about 2.5 minutes then was extruded into the atmosphere, was cooled and was cut to a granular form. The product was heated at 95° C. under an absolute pressure of from 2–5 millimeters to remove volatile ingredients, then was cooled. The devolatilized product was analyzed and was found to have a melt index of 1.6 and to contain 8 percent by weight of chemically combined methacrylic acid. It was a graft copolymer.

EXAMPLE 9

A charge of 1500 grams of polyethylene having a melt index of 20 was placed in a Baker-Perkins type mixer, purged with nitrogen gas, and was mixed and heated to 135° C. Thereafter, there was added slowly with mixing 170 grams of acrylic acid containing 0.1 ml. of di-tert.-butyl peroxide, over a period of 55 minutes. The resulting mixture was blended at 135° C. for one hour, then was removed from the mixer and was allowed to cool to room temperature. There was obtained 1645 grams of graft copolymer containing 9 percent by weight of chemically combined acrylic acid. The product was soluble in boiling toluene.

We claim:
1. A method for making a graft copolymer which comprises malaxating a normally solid resinous thermoplastic polymer selected from the group consisting of (a) homopolymers of aliphatic olefins containing from 2 to 4 carbon atoms in the molecule and (b) copolymers consisting of at least two interpolymerized aliphatic olefins containing from 2 to 4 carbon atoms in the molecule, at heat- plastifying temperatures between 110° and 250° C., which avoids appreciable deterioration of the polymer molecules, while contacting the heat-softened polymer with a monomer selected from the group consisting of acrylic acid and methacrylic acid having dissolved therein from 0.04 to 5 percent by weight of an organic peroxygen compound having a half-life of at least 15 minutes as determined in benzene at 100° C., and in amount corresponding to from about 1 to 100 parts by weight of said monomer per 100 parts by weight of the heat-softened polymer, for a time sufficient to polymerize substantially all of the monomer.

2. A method for making a graft copolymer which comprises malaxating a normally solid resinous thermoplastic polymer selected from the group consisting of (a) homopolymers of aliphatic olefins containing from 2 to 4 carbon atoms in the molecule and (b) copolymers consisting of at least two interpolymerized aliphatic olefins containing from 2 to 4 carbon atoms in the molecule, at heat-plastifying temperatures between 110° and 250° C. which avoids appreciable deterioration of the polymer molecules while contacting the heat-softened polymer with a monomer selected from the group consisting of acrylic acid and methacrylic acid having dissolved therein from 0.04 to 5 percent by weight of an organic peroxygen compound having a half-life of at least 15 minutes as determined in benzene at 100° C. and in amount corresponding to from 1 to 100 parts by weight of said monomer per 100 parts by weight of the heat-softened polymer for a time sufficient to polymerize at least a predominant amount of said monomer and thereafter separating the graft copolymer from the reacted mixture.

3. A method according to claim 2, wherein the polymer is polyethylene.

4. A method according to claim 2, wherein the monomer is acrylic acid.

5. A method according to claim 2, wherein the polymer is polypropylene.

6. A method according to claim 2, wherein the monomer is methacrylic acid.

7. A method for making a graft copolymer which comprises malaxating polyethylene at heat-plastifying temperatures between 110° and 250° C. which avoids appreciable deterioration of the polymer molecules while contacting the heat-softened polyethylene with acrylic acid containing from 0.04 to 5 percent by weight of an organic peroxygen compound having a half-life of at least 15 minutes as determined in benzene at 100° C. and in amount corresponding to from 1 to 100 parts by weight of the acrylic acid per 100 parts by weight of the heat-softened polyethylene for a time sufficient to polymerize at least a predominant amount of the acrylic acid and thereafter separating the graft copolymer from the reacted mixture.

8. A method for making a graft copolymer which comprises malaxating polypropylene at heat-plastifying temperatures between 110° and 250° C. which avoids appreciable deterioration of the polymer molecules while contacting the heat-softened polypropylene with methacrylic acid having from 0.04 to 5 percent by weight of an organic peroxygen compound having a half-life of at least 15 minutes as determined in benzene at 100° C. and in amount corresponding to from 1 to 100 parts by weight of the methacrylic acid per 100 parts by weight of the heat-softened polypropylene for a time sufficient to polymerize at least a predominant amount of the methacrylic acid and thereafter separating the graft copolymer from the reacted mixture.

References Cited by the Examiner

UNITED STATES PATENTS 2,970,129　1/61　Rugg et al. _____ 260—878

FOREIGN PATENTS 219,935　1/59　Australia.
679,562　9/52　Great Britain.
814,393　6/59　Great Britain.

LEON J. BERCOVITZ, *Primary Examiner.*